No. 779,248. PATENTED JAN. 3, 1905.
T. E. AMBURN.
JOURNAL BOX.
APPLICATION FILED OCT. 21, 1903.

Witnesses
O. W. Holmes
Hubert D. Lawson

Inventor
Thomas E. Amburn
By Victor J. Evans
Attorney

No. 779,248.

Patented January 3, 1905.

UNITED STATES PATENT OFFICE.

THOMAS E. AMBURN, OF DONIPHAN, MISSOURI.

JOURNAL-BOX.

SPECIFICATION forming part of Letters Patent No. 779,248, dated January 3, 1905.

Application filed October 21, 1903. Serial No. 177,883.

*To all whom it may concern:*

Be it known that I, THOMAS E. AMBURN, a citizen of the United States, residing at Doniphan, in the county of Ripley and State of Missouri, have invented new and useful Improvements in Journal-Boxes, of which the following is a specification.

My invention relates to new and useful improvements in journal-bearings; and its object is to provide a device of this character having novel means for securing caps upon the bearings and for supporting a bridle thereabove.

With the above and other objects in view the invention consists in the novel construction and combination of parts hereinafter more fully described and claimed, and illustrated in the accompanying drawings, showing the preferred form of my invention, and in which—

Figure 1:
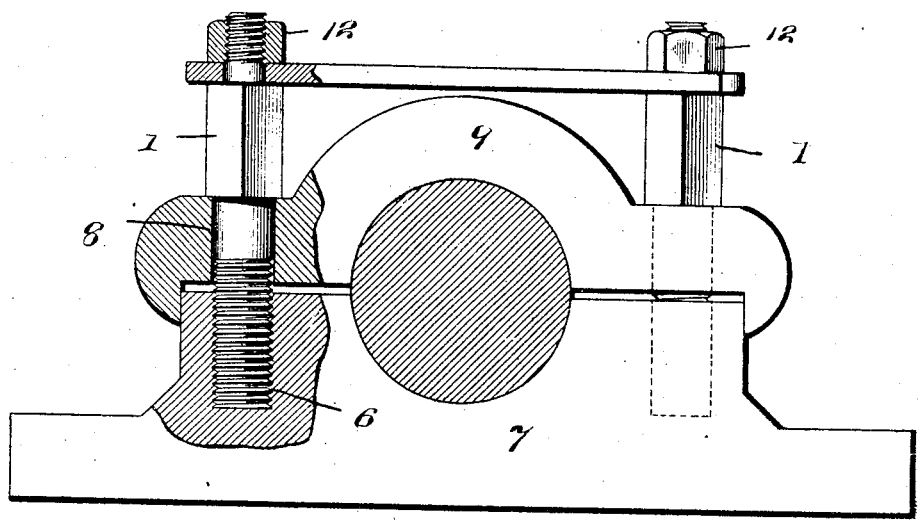
Figures 2, 3:
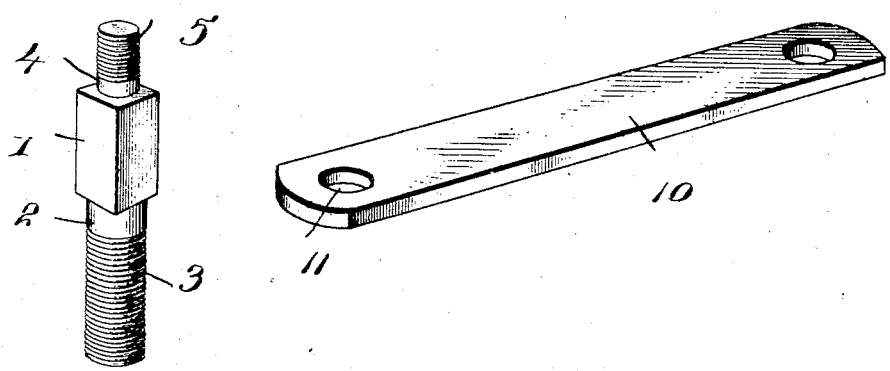

Figure 1 is a view of a journal-bearing having my improved cap-securing devices in position thereon. Fig. 2 is a detail view of the bridle, and Fig. 3 is a similar view of one of the screws.

Referring to the figures by numerals of reference, 1 is a preferably rectangular head, from one end of which projects a cylindrical extension 2, having a screw 3 integral therewith. A cylindrical extension 4 is centrally arranged at the other end of the head 1 and is also provided with an integral screw 5. These screws and extensions may be of different or the same diameters, according to the devices for which the screws are designed.

In using the screws for securing caps upon journal-bearings screw-threaded apertures 6 are formed within the bearing 7, and passages 8 are formed within the ends of the bearing-cap 9. The screws are then inserted into these passages and placed in engagement with the recesses 6 and are turned until the heads 1 are brought into contact with the upper face of the cap 9. A strap or bridle 10 is then placed upon the screws, the same being provided with apertures 11 near its ends for the reception of the cylindrical extension 4. Nuts 12 or other suitable clamping means are then placed upon the screws 5, so as to firmly bind the bridle in position upon the heads 1.

While the screw herein described is especially adapted for fastening caps upon journal-bearings, I do not desire to restrict myself to such use, for, if desired, it can be employed in other devices where it could be used advantageously.

Having thus described the invention, what is claimed as new is—

A journal-box comprising a bearing-block formed with threaded recesses, a cap having plane passages to register with said recesses, and a bridle having plane openings to register with the passages in the cap, in combination with duplicate means for connecting said parts, each of said means comprising a head arranged to rest upon the cap and support the bridle, and projections from said heads to slidably engage the passages in the cap and the openings in the bridle, said projections beyond the cap having threaded engagement with the recesses in the block, and means to secure the parts in assembled position.

In testimony whereof I affix my signature in presence of two witnesses.

THOMAS E. AMBURN.

Witnesses:
 W. H. STONE,
 JAMES W. COTTON.